United States Patent
Stehmeier

(10) Patent No.: US 10,681,057 B2
(45) Date of Patent: Jun. 9, 2020

(54) DEVICE AND METHOD FOR CONTROLLING A COMMUNICATION NETWORK

(71) Applicant: Rheinmetall Defence Electronics GmbH, Bremen (DE)

(72) Inventor: Henrich Stehmeier, Bremen (DE)

( * ) Notice: Subject to any disclaimer, the term of this patent is extended or adjusted under 35 U.S.C. 154(b) by 5 days.

(21) Appl. No.: 15/509,473

(22) PCT Filed: Sep. 2, 2015

(86) PCT No.: PCT/EP2015/070057
§ 371 (c)(1),
(2) Date: Mar. 7, 2017

(87) PCT Pub. No.: WO2016/037917
PCT Pub. Date: Mar. 17, 2016

(65) Prior Publication Data
US 2017/0264620 A1    Sep. 14, 2017

(30) Foreign Application Priority Data

Sep. 8, 2014 (DE) .......................... 10 2014 217 944
May 6, 2015 (DE) .......................... 10 2015 107 073

(51) Int. Cl.
*H04L 29/06* (2006.01)
*H04L 12/715* (2013.01)

(52) U.S. Cl.
CPC ............ *H04L 63/105* (2013.01); *H04L 45/64* (2013.01); *H04L 63/029* (2013.01); *H04L 63/0428* (2013.01); *H04L 63/1491* (2013.01)

(58) Field of Classification Search
CPC ...... H04L 63/105; H04L 45/64; H04L 63/029; H04L 63/0428; H04L 63/1491
See application file for complete search history.

(56) References Cited

U.S. PATENT DOCUMENTS 5,991,749 A     11/1999  Morrill, Jr.
7,987,274 B2    7/2011   Larson et al.
2010/0036900 A1*  2/2010  Ross ..................... G06F 7/58
                                                        708/254

(Continued)

FOREIGN PATENT DOCUMENTS

DE     102015107071 B3     11/2016

OTHER PUBLICATIONS

Jafarian, Jafar Haadi et al., "OpenFlow Random Host Mutation: Transparent Moving Target Defense using Software Defined Networking" HotSDN'12, Aug. 13, 2012, Helsinki, Finland, pp. 127-132. (Year: 2012).*

(Continued)

*Primary Examiner* — Michael Pyzocha
(74) *Attorney, Agent, or Firm* — Alleman Hall Creasman & Tuttle LLP

(57) ABSTRACT

A device for controlling a communication network having a plurality of terminals for a data communication is provided. The device comprises a control unit configured to decouple a data plane and a control plane of the data communication and to modify at least one characteristic of the communication network which is visible from the outside of the communication network during a communication session using the decoupled control plane.

26 Claims, 6 Drawing Sheets

(56) References Cited

U.S. PATENT DOCUMENTS

| | | | | |
|---|---|---|---|---|
| 2010/0043067 | A1* | 2/2010 | Varadhan | H04L 12/18 726/13 |
| 2013/0250770 | A1* | 9/2013 | Zou | H04L 47/19 370/238 |
| 2013/0283374 | A1* | 10/2013 | Zisapel | H04L 63/1441 726/22 |
| 2014/0089500 | A1* | 3/2014 | Sankar | H04L 47/125 709/224 |
| 2014/0153572 | A1* | 6/2014 | Hampel | H04L 12/6418 370/392 |
| 2015/0026794 | A1* | 1/2015 | Zuk | H04L 63/0227 726/13 |
| 2015/0149812 | A1* | 5/2015 | Arisoylu | G06F 11/0793 714/4.1 |
| 2015/0180769 | A1* | 6/2015 | Wang | H04L 45/38 370/236 |
| 2015/0188772 | A1* | 7/2015 | Gasparakis | H04L 41/12 709/224 |
| 2015/0215219 | A1* | 7/2015 | Mattsson | H04L 47/2475 370/401 |
| 2015/0234725 | A1* | 8/2015 | Cillis | G06F 11/263 714/33 |
| 2015/0301841 | A1* | 10/2015 | MacKintosh | G06F 8/52 717/136 |
| 2015/0326532 | A1* | 11/2015 | Grant | H04L 63/0218 726/1 |
| 2015/0381428 | A1* | 12/2015 | Ong | H04L 41/12 709/223 |
| 2016/0105357 | A1* | 4/2016 | K | H04L 45/42 370/389 |
| 2016/0112326 | A1* | 4/2016 | Farmanbar | H04W 28/12 370/230.1 |
| 2016/0205071 | A1* | 7/2016 | Cooper | H04L 12/6418 726/1 |
| 2016/0294734 | A1* | 10/2016 | Jang | H04L 41/0654 |
| 2016/0294793 | A1* | 10/2016 | Larson | H04L 63/0884 |
| 2016/0323313 | A1* | 11/2016 | Narain | H04L 63/1475 |
| 2016/0330077 | A1* | 11/2016 | Jin | H04L 41/0806 |
| 2017/0295035 | A1* | 10/2017 | Mathew | H04L 12/6418 |
| 2019/0166037 | A1* | 5/2019 | Shaikh | H04L 41/08 |

OTHER PUBLICATIONS

"Internet Protocol: DARPA Internet Program Protocol Specification," RFC: 791, University of Southern California Information Sciences Institute, Sep. 1981, 50 pages.

Townsley, W. et al., "Layer Two Tunneling Protocol 'L2TP'," RFC: 2661, Network Working Group, Standards Track, Aug. 1999, 80 pages.

Hinden, R. et al., "Internet Protocol Version 6 (IPv6) Addressing Architecture," RFC: 3513 Network Working Group, Standards Track, Apr. 2003, 26 pages.

"OpenVPN," Open VPN Website, Available Online at https://web.archive.org/web/20050122040657/http://openvpn.net/, Available as Early as Jan. 22, 2005, 4 pages.

Kent, S. et al., "Security Architecture for the Internet Protocol," RFC: 4301, Network Working Group, Standards Track, Dec. 2005, 101 pages.

McKeown, N. et al., "OpenFlow: Enabling Innovation in Campus Networks," ACM SIGCOMM Computer Communication Review, vol. 38, No. 2, Apr. 2008, 6 pages.

"Software-Defined Networking: The New Norm for Networks," Open Networking Foundation White Paper, Apr. 13, 2012, 12 pages.

Kerner, M., "OpenFlow SDN Inventor Martin Casado on SDN, VMware, and Software Defined Networking Hype [Video]," Enterprise Networking Planet Website, Available Online at http://www.enterprisenetworkingplanet.com/netsp/openflow-inventor-martin-casado-sdn-vmware-software-defined-networking-video.html, Apr. 29, 2013, 2 pages.

Kampanakis, P. et al., "SDN-based solutions for Moving Target Defense network protection," Proceedings of the IEEE 15th International Symposium on a World of Wireless, Mobile and Multimedia Networks (WoWMoM 2014), Jun. 16, 2014, Sydney, Australia, 6 pages.

Mahalingam, M. et al., "Virtual eXtensible Local Area Network (VXLAN): A Framework for Overlaying Virtualized Layer 2 Networks over Layer 3 Networks," RFC: 7348, Independent Submission, Informational, Aug. 2014, 22 pages.

"Moving Target Defense," Department of Homeland Security Website, Available Online at https://www.dhs.gov/science-and-technology/csd-mtd, Available as Early as Sep. 8, 2014, 3 pages.

"Openmul Controller," OpenMUL Website, Available Online at http://www.openmul.org/openmul-controller.html, Available as Early as Sep. 8, 2014, 2 pages.

Zhou, H. et al., "Evolving Defense Mechanism for Future Network Security," IEEE Communication Magazine, vol. 53, No. 4, Apr. 2015, 7 pages.

ISA European Patent Office, International Search Report Issued in Application No. PCT/EP2015/070057, dated Dec. 3, 2015, WIPO, 4 pages.

European Patent Office, Office Action Issued in Application No. 15756668.8, dated Feb. 14, 2018, Germany, 5 Pages.

European Patent Office, Extended European Search Report Issued in Application No. 18202088.3, dated Jan. 18, 2019, Germany, 8 pages.

Eurasian Patent Office, Office Action Issued in Application No. 201790324/31, dated Sep. 28, 2018, 4 pages.

The Eurasian Patent Organization, Office Action Issued in Application No. 201790324/31, dated May 22, 2019, 6 pages.

Israel Patent Office, Office Action Issued in Patent Application No. 250626, dated Apr. 15, 2019, 6 pages.

China National Intellectual Property Administration, Office Action Issued in Application No. 201580048210.0, dated Aug. 27, 2019, 23 pages.

Ukrainian Institute for Industrial Property, Preliminary Opinion issued in Ukrainian Application No. 201701398, dated Mar. 8 2019, 9 pages.

Intellectual Property India, Office Action Issued in Application No. 201727005999, dated Jan. 17, 2020, 6 pages.

* cited by examiner

DEVICE AND METHOD FOR CONTROLLING A COMMUNICATION NETWORK

The present invention relates to a device for controlling a communication network with a plurality of terminals for data communication. The present invention further relates to a router with such a device, a switch with such a device, a firewall with such a device and a communication network with such a device. Moreover, the present invention relates to a method and a computer program product for controlling a communication network.

The technical background of the present invention relates to security (IT-security) of communication networks such as communication networks of companies, universities, public authorities and other organizations.

Communication networks of companies and the like are increasingly targeted by attackers, in particular in order to spy them out. The threat scenarios regarding the communication networks are increasingly specialized, are often laid out for long terms, and employ highly specialized camouflage techniques. Often, attackers look specifically for weak spots in the security strategy of the companies and the like when attacking the communication networks.

Known security solutions like firewalls, IPS- and antivirus solutions as well as web-gateways are configured to detect known attack patterns by employing signature depending security measures. However, new generations of attacks are not restricted to known attack patterns, but are dynamic. For example, targets are pursued over several attack vectors and phases, which drastically increase the threat potential for company networks.

Here, known static network configurations have the disadvantage of being an easier target with regard to spying and attacking by attackers, such as unauthorized entities.

In view of this, it is an object of the present invention to provide a more secure communication network.

According to a first aspect, a device for controlling a communication network comprising a plurality of terminals for data communication is suggested. The device comprises a control unit configured to decouple a data plane and a control plane of the data communication and to modify at least one characteristic of the communication network that is visible from outside of the communication network during a communication session using the decoupled control plane.

Because the control unit modifies, more particularly dynamically modifies, the at least one characteristic of the communication network, which is visible from the outside of the communication network, during every single communication session, it is practically impossible for an external observer or attacker of the communication network to spy out the communication network, because the configuration and thus the appearance of the communication network are undeterminable and unpredictable for the external observer. Additionally or alternatively, it is also possible to modify visible data patterns of the communication network. This increases the security of the communication network.

Examples for the at least one characteristic of the communication network, which is modifiable by the control unit, are a change of virtual addresses of the terminals of the communication network, a change of the configuration of the communication network, a change of the routing behavior of the communication network, and a change of applications and/or their port mappings.

A communication session or session is understood as a communication between one of the terminals of the communication network and a device outside of the communication network or inside the communication network. The communication session can also be based on stateless protocols such as HTTP (hypertext transfer protocol).

The control unit can be implemented by hardware and/or software. In the case of hardware implementation, the control unit can be embodied as a device or part of a device, for example as a computer or as a microprocessor or as a router or switch. In the case of software implementation, the control unit can be embodied as a computer program product, as a function, as a routine, as part of a program code or as an executable object.

A tool that can be used for implementing the control unit is the open source SDN-controller OpenMUL (see reference [1]). The OpenMUL-controller provides a SDN/OpenFlow based control platform that is implemented in C. Here, the control unit is preferably configured to make use of OpenFlow (see reference [2]) as well as the technique of Moving-Target-Defence (MTD, see reference [3]). By using MTD, the control unit is configured to dynamically modify the communication network. OpenFlow is a communication protocol, which provides access to the hardware components of a switch or a router, which process the incoming network packets (the so-called forwarding plane).

The device itself can be implemented by hardware and/or software. In the case of hardware implementation, the device can be embodied as a computer, as part of a router, part of a switch or part of a firewall. In the case of software implementation, the device can be embodied as a computer program product, as a function, as a routine, as part of a program code or as an executable object.

The communication network can also be referred to as a network or a computer network and is for example a LAN (local area network) or a WAN (wide area network).

The decoupling of the data plane and the control plane of the data communication may be provided, for example, by Software-Defined-Networking (see references [4] and [5]).

Examples for terminals of the communication network include calculators, computers, routers, switches, firewalls, embedded systems and the like.

According to an embodiment, the control unit is configured to pro-actively modify the at least one characteristic of the communication network, which is visible from the outside of the communication network, during the communication session using the decoupled control plane.

Thus, the control unit is configured to pro-actively modify the at least one visible characteristic. For this reason, the at least on characteristic of the communication system is modified yet before a threat or a damage occurs on the communication network. Hence, a proactive real time security for the communication network can be provided.

In the present case, proactive modifying is particularly understood as that the at least one visible characteristic is modified at the end of every single data stream. Thus, in contrast to the conventional reactive modifying, the present control unit is configured to pro-actively modify or pro-actively and reactively modify in case of an identified threat or a detected damage.

More particularly, the control unit is configured to pro-actively modify the communication network such that different security zones having different security levels and/or different security functions can be dynamically established. For example, the control unit can change the established security zone depending on identified threat scenarios. Furthermore, the control unit is preferably configured to establish a day operation and a night operation of the communication network, which have different security levels.

According to a further embodiment, the control unit is configured to change a virtual address of at least one of the plurality of terminals during the communication session using the decoupled control plane. A virtual address is a logical address that can be converted into a physical address by a logical unit or a computer unit.

According to a further embodiment, the device includes a random generator for outputting a random value. Here, the control unit is configured to change the virtual address depending on the random value outputted by the random generator.

According to a further embodiment, the control unit is configured to modify the configuration of the communication network during the communication session using the decoupled control plane. A change of the configuration of the communication network includes preferably a change of the established security levels or the security zones of the communication network. Hence, the device can react differently to different attack scenarios by changing the configuration of the communication network.

According to a further embodiment, the control unit is configured to modify a routing behavior of the communication network during the communication session using the decoupled control plane. Due to the suggested change of the routing behavior of the communication network, an attacker cannot draw any helpful conclusions from a recording or logging of the routing behavior of the communication network due to the lack of a static characteristic of the routing behavior.

According to a further embodiment, the control unit is configured to modify at least one application of the communication network during the communication session using the decoupled control plane. Due to the change of the application of the communication network, an attacker cannot derive any helpful information about the communication network.

According to a further embodiment, the control unit is configured to modify at least one port assignment of the at least one application during the communication session using the decoupled control plane. Due to the change of the port assignment of an application of the communication network, an attacker cannot derive any helpful information about the communication network.

According to a further embodiment, the control unit is configured to exchange a first crypto-algorithm employed by the communication network with a second crypto-algorithm during the communication session.

Here, the control unit selects the second crypto-algorithm preferably from a plurality of prepared crypto-algorithms.

Advantageously, an attacker cannot derive helpful information about the communication network as with the use of a static crypto-algorithm due to the exchange of the crypto-algorithm.

A crypto-algorithm is understood as an algorithm which calculates at least one cryptographic value, for example using a cryptographic function. Cryptographic algorithms include encrypting algorithms such as SSL (Secure Sockets Layers) as well as digital signatures. Cryptographic values may include cryptographic keys such as symmetrical keys and/or hash values.

According to a further embodiment, the control unit is configured to modify a data pattern of the communication network, particularly a payload data profile of at least one of the terminals.

By modifying a data pattern or several data patterns of the communication network, the control unit is enabled to simulate data traffic to an attacker. The simulated data traffic can also be referred to as a data mock-up or a communication mock-up. Furthermore, the control unit is preferably configured to change the terminal being coupled to the communication network, that is, the network terminals or the network participants, in order to modify the data pattern of the communication network. By modifying the data pattern, an attacker is considerably hindered in executing a successful binary pattern comparison.

According to a further embodiment, the communication session includes a plurality of transactions of data (data flows). Here, the control unit is configured to modify the at least one characteristic of the communication network, which is visible from the outside of the communication network, after a subset of the plurality of transactions.

The subset of transactions, after which the control unit modifies the at least one visible characteristic of the communication network, can be triggered or specified by a random generator.

According to a further embodiment, the communication session includes a plurality of transactions of data, wherein the control unit is configured to modify at least one characteristic of the communication network, which is visible from the outside of the communication network, after each one of the plurality of transactions.

By changing the characteristic or the characteristics after each transaction, the level of security can be increased for the communication network.

According to a further embodiment, the control unit is configured to decouple the control plane and the data plane of the data communication using Software-Defined-Networking. Software-Defined-Networking is an approach for building devices or terminals for communication networks and software, which separate two essential components, namely the data and the control commands, from one another and abstract them (see, for this purpose, references [4] and [5]).

According to a further embodiment, the device includes one random generator being coupled with the control unit. The random generator is configured to randomly or quasi-randomly trigger the control unit for modifying the at least one characteristic of the communication network, which is visible from the outside of the communication network, at least once during the communication session, more particularly several times during the communication session. The random generator or random number generator generates a series of random values or random numbers. The random generator can be formed as a deterministic random number generator or as a non-deterministic random number generator.

According to a further embodiment, the device includes a first protection unit for detecting, isolating, and antagonizing accesses from non-authorized entities on the communication network. According to this embodiment, the first protection unit is able to detect an attack or access from one entity that is not authorized for the communication network, to isolate the detected attack in the communication network, and to take measures against this attack.

According to a further embodiment, the device includes a second protection unit for warning and alerting a determination system coupled to the device. The second protection unit is preferably configured to warn and alert a determination system which is coupled to the device and which is operated by a government entity, for example.

According to a further embodiment, the device includes a third protection unit for restoring of at least one critical network function.

Here, the third protection unit can be particularly configured to start up at least one redundant unit for executing a critical network function upon detection of a failure of a critical network function in order to restore the critical network function. Accordingly, the present device is advantageously able to automatically restore critical network functions.

According to a further embodiment, the device includes an analyzing unit for providing analyzing data during accesses on the communication network from non-authorized entities.

According to a further embodiment, the device includes a data determination unit for determining, using the provided analyzing data, status data which is particularly able to specify a security situation of the communication network.

According to a further embodiment, the device includes an interface unit for transmitting the status data to a determination system that is coupleable to the device. Here, the determination system can also be coupled to the device via the Internet, for example. The interface unit is then configured to establish a cryptographically protected transmission between the determination system and the device. For example, the interface unit can also establish a protected communication tunnel between the device and the determination system.

According to a further embodiment, the communication network comprises an infrastructure including layers that are stacked on one another. In particular, the infrastructure has the following layers stacked on one another: layer-1, layer-2, layer-3, layer-4, layer-5, layer-6, layer-7. Here, the control unit is implemented as a virtual overlay-network that overlays the layer-2 and the layer-3.

According to a further embodiment, the virtual overlay-network is implemented by using virtual-extensible LAN. For example, the overlay-network is implemented by VXLAN (virtual extensible LAN). VXLAN is an encapsulation-protocol for letting the overlay network run on an existing layer-3 infrastructure (see reference [6]).

According to a further embodiment, the control unit is incorporated into a firewall, into a switch, or into a router of the communication network.

According to a further embodiment, the control unit is implemented by software.

According to a further embodiment, the device supports IPv4 (Internet protocol version 4; see reference [7]) and IPv6 (Internet protocol version 6; see reference [8]).

According to a further embodiment, the device uses a combination of a security protocol and a tunneling-protocol. By using the tunneling-protocol, the security of the data communication can be further increased.

An example for the security protocol is IPsec (see reference [9]). An example for the tunneling-protocol is L2TP (see reference [10]). A further example of a suitable tunneling protocol is open-VPN (see reference [11]).

The respective unit such as the analyzing unit or the protection unit can be implemented as hardware and/or software. In case of a hardware implementation, the unit can be formed as a device or as a part of a device, for example as a computer or as a microprocessor or as a switch. In the case of software implementation, the unit can be embodied as a computer program product, as a function, as a routine, as part of a program code or as an executable object.

According to a second aspect, a router for a communication network is suggested, which incorporates a device according to the first aspect or according to one of its embodiments. In particular, a router is understood as a network device that can forward network packets between several communication networks. A router can be employed for connecting to the Internet, for a secure coupling of several locations of a company, or for a direct coupling of several local network segments, if necessary with adaption to different Internet protocols.

According to a third aspect, a switch for a communication network is suggested which incorporates a device according to the first aspect or according to one of its embodiments. A switch is understood as a coupling element that can connect network segments with one another. It takes care within a network segment that the data packets reach their destination. A switch can also be referred to as a network switch or distributor.

According to a fourth aspect, a firewall for a communication network is suggested which incorporates a device according to the first aspect or according to one of its embodiments. A firewall is understood as a network element which protects a communication network, a part of the communication network, or a single computer of the communication network against unwanted network accesses. A firewall can represent a security system or can be part of a security system.

According to a fifth aspect, a communication network is provided which incorporates a plurality of terminals for data communication and a device according to the first aspect or according to one of its embodiments.

According to a sixth aspect, a method for controlling a communication network having a plurality of terminals for data communication is suggested. The method includes decoupling of a control plane and a data plane of the data communication, and modifying at least one characteristic of the communication network that is visible from outside of the communication network during a communication session using the decoupled control plane.

According to a seventh aspect, a computer program product is suggested which causes the execution of the method according to the sixth aspect on a program controlled unit.

A computer program product, such as a computer program means, can be provided or supplied, for example, as a recording medium such as a memory card, USB-stick, CD-ROM, DVD or in form of a file that can be downloaded from a server in a network. This can be achieved, for example, in a wireless communication network by transmitting a respective file having the computer program product or the computer program means.

The embodiments and features described for the suggested device apply to the suggested method respectively.

Possible further implementations of the invention include also non-explicitly mentioned combination of the above or below mentioned features or embodiments described with regard to the exemplary embodiments. Here, the skilled person will also add single aspects as improvements or additions to the respective fundamental form of the invention.

In the following, the invention is explained in detail on the basis of the preferred embodiments with reference to the accompanying figures.

Elements that are the same or have the same function are designated with the same reference numerals in the figures unless otherwise stated.

Figure 1:
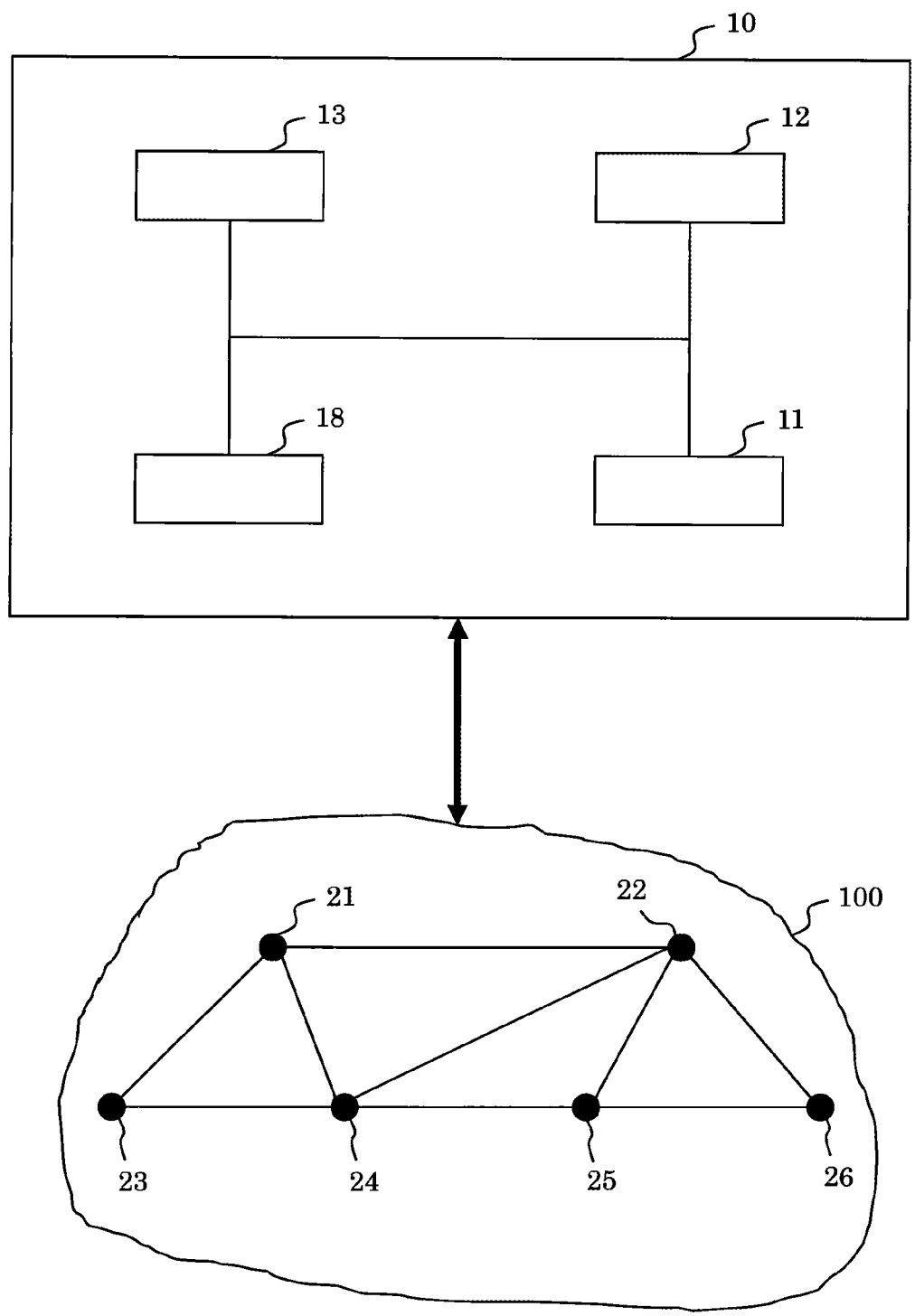
FIG. 1 shows a schematic bock diagram of a first embodiment of a device for controlling a communication network.

A schematic block diagram of a first embodiment of a device 10 for controlling a communication network 100 is shown in FIG. 1. The communication network 100 includes a plurality of terminals 21-26 for data communication. The plurality of terminals 21-26 can include router, switches, firewalls, computers, personal computers, embedded systems, control facilities or the like. The communication network 100 is a LAN (local area network) or a WAN (wide area network), for example. The device 10 for controlling the communication network 100 can also be referred to as a control device 10.

The embodiment of the device 10 in FIG. 1 includes a control unit 11, an analyzing unit 12, a DNS unit 13 (DNS; Domain Name Server), and a protection unit 18. The control unit 11, the analyzing unit 12, the DNS unit 13, and the protection unit 18 may be logically or physically coupled or connected. For example, the device 10 can be formed as a computer incorporating the control unit 11, the analyzing unit 12, the DNS unit 13 and the protection unit 18.

The control unit 11 of the device is configured to decouple a data plane L1 (see FIG. 5) and a control plane L2 (see FIG. 5) of the data communication. The data plane L1 can also be referred to as data layer or data level. The control plane L2 can also be referred to a control layer or control level.

Furthermore, the control unit 11 is configured to modify at least one characteristic of the communication network 100 which is visible from the outside 200 (see FIG. 4) of the communication network 100 using the decoupled control plane L2. For example, outside of the communication network 100 refers to an entity, such as a computer, which is arranged in the Internet 200 (see FIG. 4) and which is not authorized and/or not authenticated with regard to the communication network 100.

Examples for the at least one characteristic of the communication network 100, which is modifiable by the control unit 100, are the following: a change of virtual addresses of the terminals 21-26 of the communication network 100, a change of the configuration of the communication network 100, a change of the routing behavior of the communication network 100, and/or a change of applications and/or the port mappings of the applications in the communication network 100.

In particular, the control unit 11 is configured to pro-actively modify the communication network 100. Here, the control unit 11 is particularly configured to pro-actively modify the communication network 100 such that different security zones having different security levels in the communication network 100 and/or different security functions in the communication network 100 are established. More particularly, the control unit 11 can change the established security zones and therewith the configuration of the communication network 100 depending on an identified threat scenario.

Moreover, the control unit 11 is configured to exchange a first crypto-algorithm employed by the communication network 100 with a second crypto-algorithm during the operation of the communication network 100.

Additionally or alternatively, the control unit 11 is configured to modify a data pattern of the communication network 100. An example for such a data pattern of the communication network 100 is a payload data profile of at least one of the terminals 21-26.

A communication session as described above can include a plurality of transactions of data (data flows). Here, the control unit 11 is configured to modify the at least one characteristic of the communication network 100, which is visible from the outside 200 of the communication network 100, after a subset of the plurality of transactions. The subset of the plurality of transactions can also be 1 such that the control unit 11 modifies the at least one visible characteristic of the communication network 100 after every single transaction.

Figure 3:
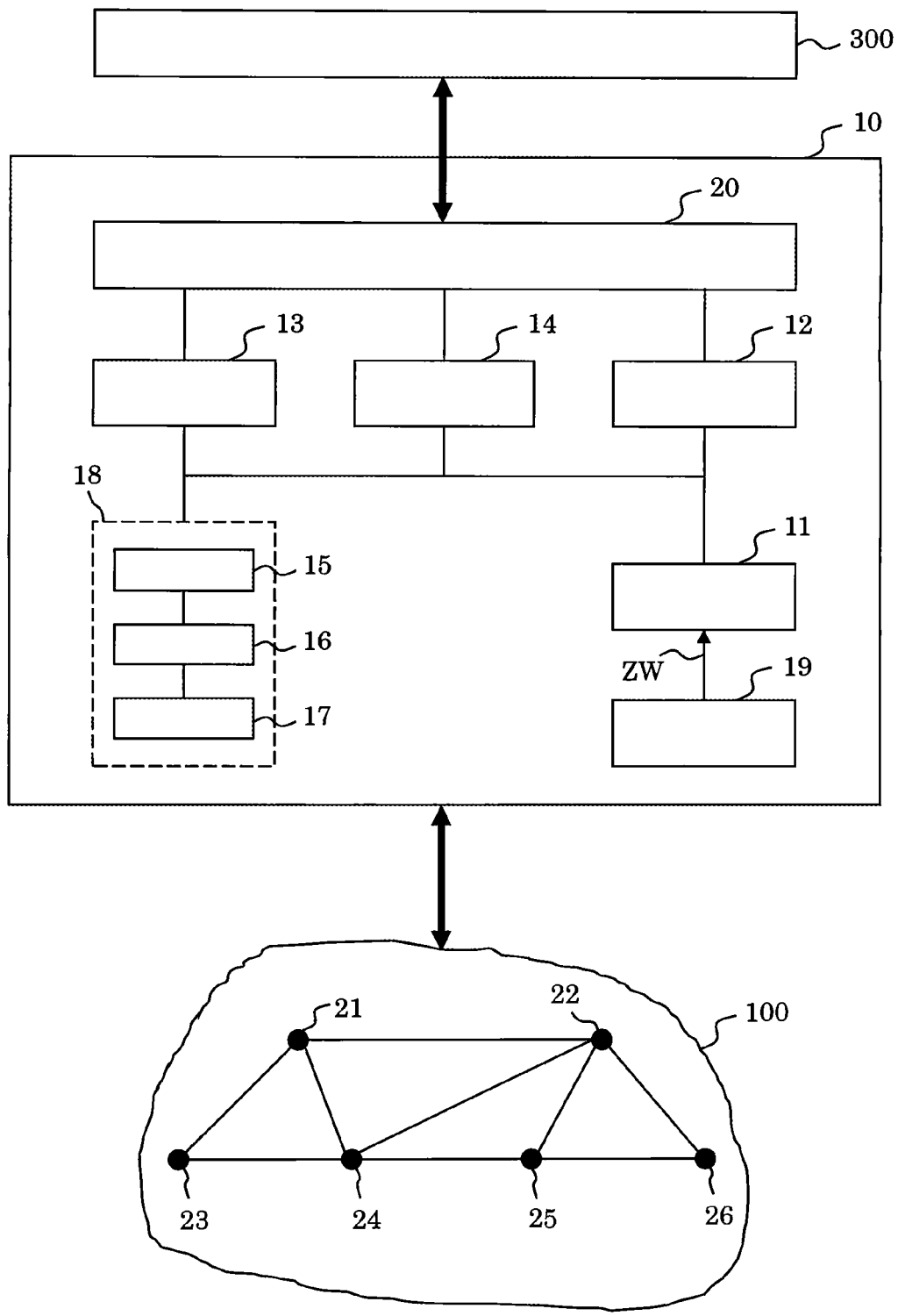
FIG. 3 shows a schematic bock diagram of a third embodiment of a device for controlling a communication network.

The analyzing unit 12 of the device 10 is preferably configured to provide analyzing data during accesses on the communication network 100 from non-authorized entities. FIG. 3 shows details on this supply of analyzing data to a determination system 300 being coupleable to the device 10, which will be explained below.

Figure 2:
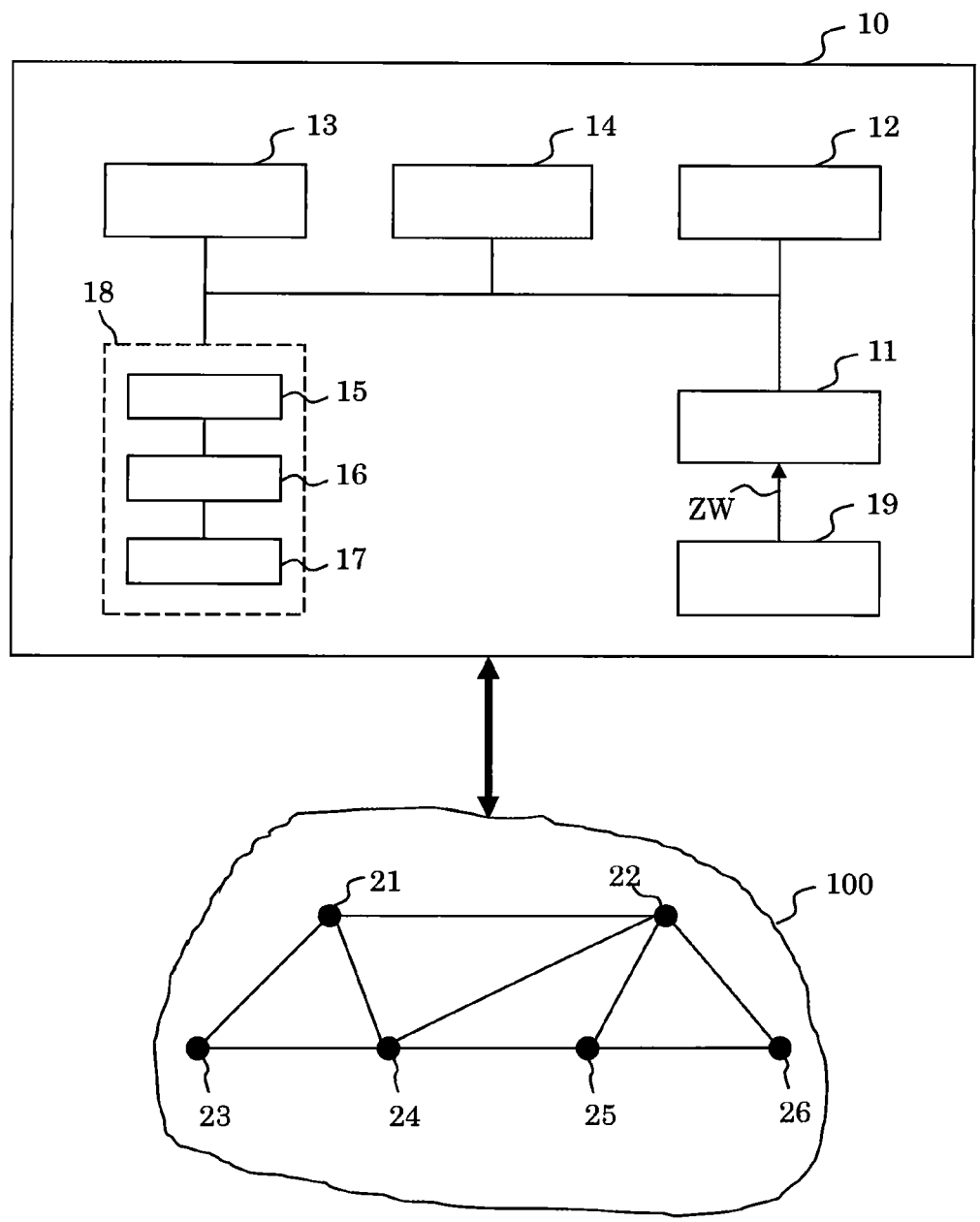
FIG. 2 shows a schematic bock diagram of a second embodiment of a device for controlling a communication network.

FIG. 2 shows a schematic block diagram of a second embodiment of a device 10 for controlling a communication network 100. The second embodiment of FIG. 2 includes all features of the first embodiments of FIG. 1. Furthermore, the device 10 of FIG. 2 comprises a data analyzing unit 14 and a random generator 19 of providing a random value ZW. Moreover, FIG. 2 shows that the protection unit 18 includes a first protection unit 15, a second protection unit 16, and a third protection unit 17.

The data analyzing unit 14 is configured for determining status data using the analyzing data being provided from the analyzing unit 12. In particular, the status data indicate a security situation of the communication network 100.

As described above, the random number generator 19 outputs a random value ZW. Here, the control unit 11 is configured to change, for example, a virtual address of one of the terminals 21-26 depending on the random value ZW outputted by the random generator 19. Further, the random generator 19 can be configured to randomly or quasi-randomly trigger the control unit 11 for modifying the at least one characteristic, which is visible from the outside 200 of the communication network 100, at least once during the communication session or also several times during the communication session.

As described above, the protection unit 18 of the FIG. 2 includes the first protection unit 15, the second protection unit 16, and the third protection unit 17. The first protection unit 15 is configured for detecting, isolating, and antagonizing accesses from non-authorized entities on the communication network 100. The second protection unit 16 is configured for warning and alerting a determination system 300 that can be coupled to the device 10. The third protection unit 17 is configured for restoring at least one critical network function of the communication network 100.

As to that, FIG. 3 shows a third embodiment of a device 10 for controlling a communication network 100. The third embodiment of FIG. 3 includes all features of the second embodiment of FIG. 2. Furthermore, the device 10 of FIG. 3 includes an interface unit 20 being configured to couple the device 10 to a determination system 300. For example, the interface unit 20 is coupled to the analyzing unit 12, the DNS unit 13, and the data analyzing unit 14. The interface unit 20 can also be coupled to further units of the device 10 such as the control unit 11 or the random generator 19 (not shown). For example, the random generator 19 can be initiated via the interface unit 20.

Figure 4:
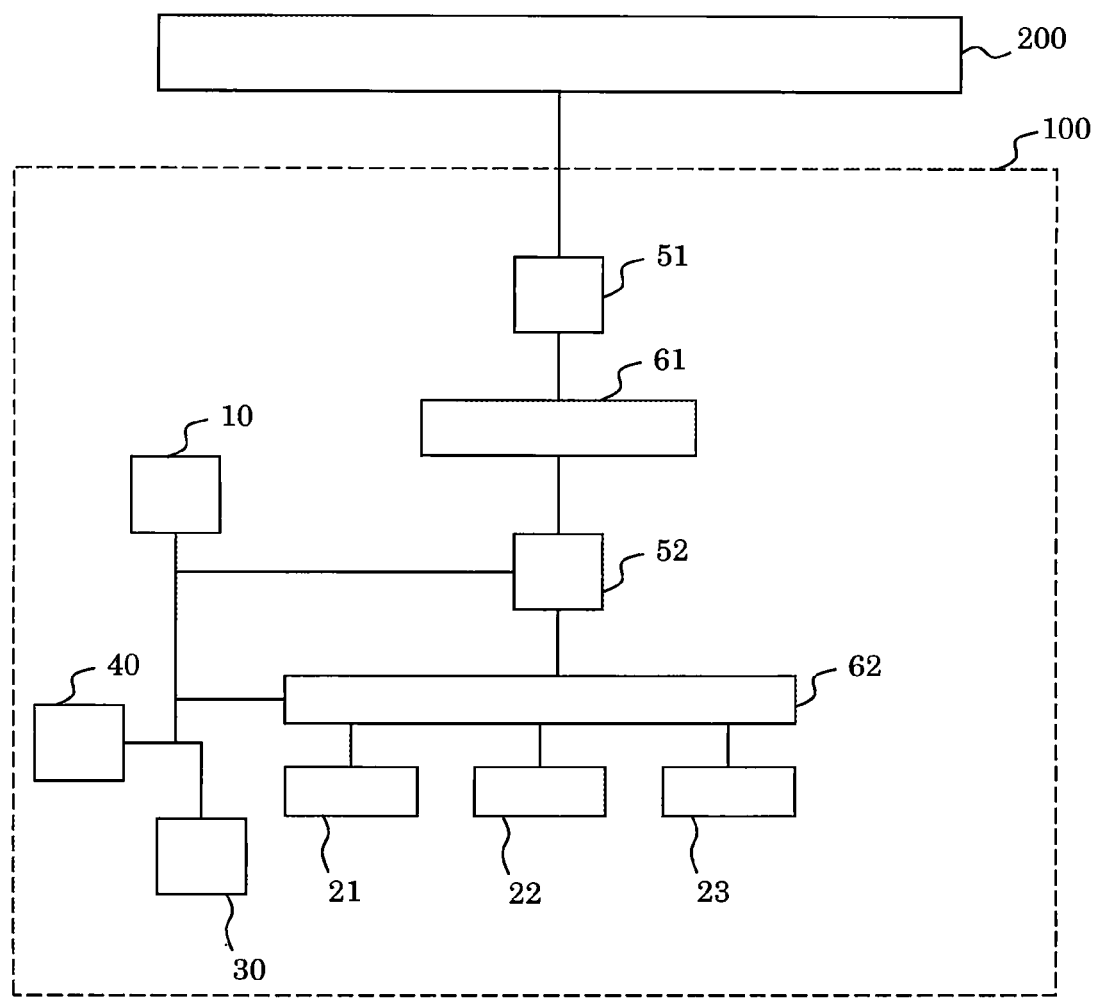
FIG. 4 shows a schematic block diagram of a communication network with a device according to one of the FIGS. 1 to 3.

In FIG. 4, a schematic block diagram of a communication network 100 is shown. The communication network 100 includes a device 10 which is embodied according to one of the embodiments of FIGS. 1 to 3.

Further, the communication network 100 of FIG. 4 has a number of terminals 21-23. Without loss of generality, the embodiment of FIG. 4 shows three terminals 21-23.

Moreover, the communication network 100 of FIG. 4 includes a router 30, a switch 40, a first firewall 51, a second firewall 52, a demilitarized LAN 61 being coupled between the first firewall 51 and the second firewall 52, and an internal LAN 62 coupling the plurality of terminals 21-23 to the second firewall 52 (internal firewall) as well as to the router 30, the switch 40, and the device 10.

Further, FIG. 4 shows that the communication network 100 can be coupled to the Internet 200. The above mentioned non-authorized entities that potentially attack the communication network 100 are particularly arranged in the Internet 200 or connected with it.

Figure 5:
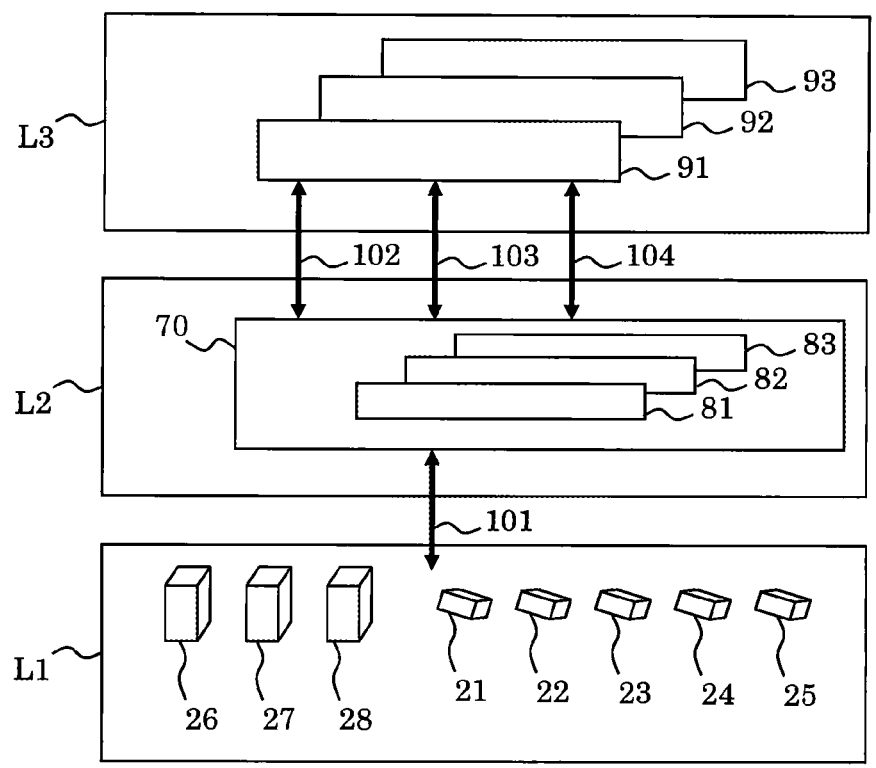
FIG. 5 shows a schematic block diagram of a SDN-architecture with a decoupled data plane and control plane for implementing a control unit.

FIG. 5 shows a schematic block diagram of a SDN architecture having decoupled data planes L1 and control planes L2 for implementing an embodiment of the control unit 11.

The architecture of FIG. 5 shows that the data plane L1, the control plane L2, and the application plane L3 are decoupled from one another. The planes or layers L1, L2, L3 are connected communication-wise with one another via APIs 101-104 (API; Application Programming Interface).

The API 101 can also be referred to as Southbound-API. For example, the Southbound-API is implemented using OpenFlow. The APIs 102-104 can also be referred to as Northbound-APIs.

Physical network devices 21-25 and virtual network devices 26-28 are arranged in the data plane L1. The number and the distribution of the physical network devices 21-25 and the virtual network devices 26-28 in the data plane L1 are merely exemplary.

The control plane L2 includes a SDN control software 70 having different network services 81-83 for implementing the control unit 11.

The application plane L3 includes several applications 91-93. The applications 91-93 can also be referred to as business applications.

As described above, the lowest plane or layer of the SDN architecture is the data plane L1 which includes a plurality of network devices 21-28. It is not distinguished between the physical and the virtual network devices 21-28 or the switches in the control plane L2. Therefore, the virtual network devices 26-28 are also considered to the data level L1. The communication between the data plane L1 and the control plane L2 are represented by a Southbound protocol via the Southbound interface 101. Here, it is a precondition that the participating network devices 21-28 have a command on the employed Southbound-protocol. In particular, the network devices 21-28 need only to support a minimal set of commands of the Southbound-protocol. For implementing this, Open Flow can be employed. A task of the Southbound-protocol is the implementation of a basic set of commands for manipulating the flow tables in the switches in order to make the complexity and heterogeneity transparent on the data plane L1.

The SDN control software 70 is arranged on the control plane L2. This one can also be understood as middleware that abstracts the network devices 21-28 of the data plane L1 for the SDN application.

Figure 6:
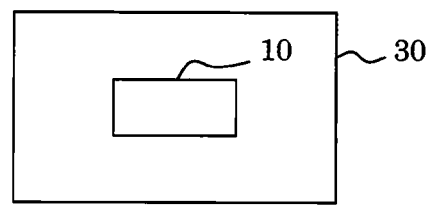
FIG. 6 shows a schematic block diagram of an embodiment of a router with a device for controlling a communication network according to one of the FIGS. 1 to 3.

FIG. 6 shows a schematic block diagram of an embodiment of a router 30 that incorporates a device 10 for controlling a communication network 100. The device 10 is embodied according to one of the embodiments of FIGS. 1 to 3, for example.

Figure 7:
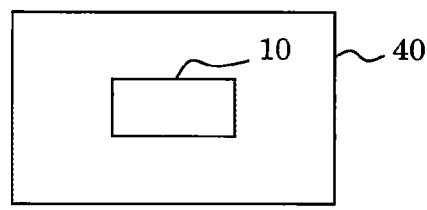
FIG. 7 shows a schematic block diagram of an embodiment of a switch with a device for controlling a communication network according to one of the FIGS. 1 to 3.

FIG. 7 shows a schematic block diagram of an embodiment of a switch 40 that incorporates a device 10 for controlling a communication network 100. The device 10 is embodied according to one of the embodiments of FIGS. 1 to 3, for example.

Figure 8:
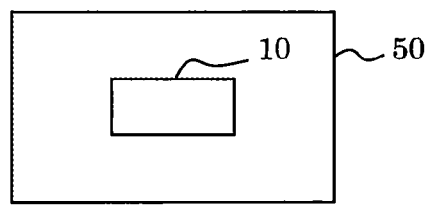
FIG. 8 shows a schematic block diagram of an embodiment of a firewall with a device for controlling a communication network according to one of the FIGS. 1 to 3.

FIG. 8 shows a schematic block diagram of an embodiment of a firewall 50 that incorporates a device 10 for controlling a communication network 100. The device 10 is embodied according to one of the embodiments of FIGS. 1 to 3, for example.

Figure 9:
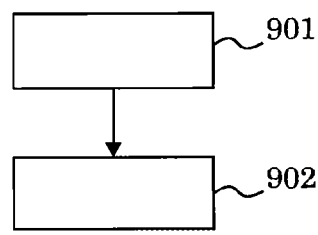
FIG. 9 shows a schematic flow chart of an embodiment of a method for controlling a communication network.

In FIG. 9, a schematic flow chart of an embodiment of a method for controlling a communication network 100 is shown. The method of FIG. 9 includes the following steps 901 and 902.

In step 901, a data plane L1 and a control plane L2 of the data communication are decoupled from one another. The results of step 901 are a control plane L2 that is decoupled from the data plane L1 and a data plane L1 that is decoupled from the control plane L2.

In step 902, a characteristic of the communication network 100, which is visible from the outside of the communication network 100, is modified using the decoupled control plane L2.

Although the present invention has been described on the basis of embodiments, it can be modified manifold. For example, it is possible to arrange the device for controlling the communication network also in another entity of the communication network being shown in the figures (e.g. router or switch). Moreover, it is also conceivable to arrange the device for controlling the communication network outside of the communication network. Further, the tool Open-MUL for implementing the control unit of the device for controlling the communication network is merely exemplary. Alternative tools can also be employed.

LIST OF REFERENCE NUMERALS 10 device
11 control unit
12 analyzing unit
13 DNS unit
14 data analyzing unit
15 first protection unit
16 second protection unit
17 third protection unit
18 protection unit
19 random generator
20 interface unit
21 terminal
22 terminal
23 terminal
24 terminal
25 terminal
26 terminal 27 terminal
28 terminal
30 router
40 switch
50 firewall
51 firewall
52 firewall
61 LAN
62 LAN
70 SDN control software
81-83 network service
91-93 application
100 communication network
101 API
102 API
103 API
104 API
200 Internet
300 determination system
L1 data plane
L2 control plane
L3 application plane
ZW random value

REFERENCES

[1] http://www.openmul.org/openmul-controller.html (downloadable at the priority date)
[2] Nick McKeown et al.: OpenFlow: Enabling innovation in campus networks, ACM Communications Review, April 2008
[3] http://www.dhs.gov/science-and-technology/csd-mtd (downloadable at the priority date)
[4] Software-Defined Networking: The New Norm for Networks, White Paper, Open Networking Foundation, 13. April 2012
[5] Sean Michael Kerner: OpenFlow Inventor Martin Casado on SDN, VMware, and Software Defined Networking Hype, Enterprise Networking Planet, 29. April 2013
[6] RFC7348: Virtual eXtensible Local Area Network (VXLAN): A Framework for Overlaying Virtualized Layer 2 Networks over Layer 3 Networks
[7] RFC791—Internet Protocol; Ipv4
[8] RFC3513—Internet Protocol; IPv6
[9] RFC4301—IPsec
[10] RFC2661—L2TP
[11] Open-VPN: https://openvpn.net/Page

The invention claimed is:

1. A device for controlling a communication network having a plurality of terminals for a data communication, comprising:
a processor;
a memory storing instructions that are executed by the processor; and
a controller including the processor that is configured to decouple a data plane and a control plane of the data communication and to pro-actively modify at least one characteristic of the communication network which is visible from an outside of the communication network during a communication session using the decoupled control plane, wherein
the device further includes a random generator that is coupled to the controller and configured to randomly trigger the controller for modifying the at least one characteristic, which is visible from the outside of the communication network, at least once during the communication session, and
the controller is configured to modify one or a plurality of data patterns of the communication network, the controller being randomly triggered by the random generator and thus enabled to simulate data traffic as a data mock-up to an attacker that is attacking the communication network from the outside of the communication network.

2. The device according to claim 1,
characterized in that
the controller is configured to pro-actively modify the communication network such that different security zones having different security levels and/or different security functions are dynamically establishable in the communication network.

3. The device according to claim 1,
characterized in that
the controller is configured to change a virtual address of at least one of the plurality of terminals during the communication session using the decoupled control plane.

4. The device according to claim 3,
characterized by
the random generator for outputting a random value, wherein the controller is configured to change the virtual address depending on the random value outputted by the random generator.

5. The device according to claim 1,
characterized in that
the controller is configured to modify a configuration of the communication network during the communication session using the decoupled control plane.

6. The device according to claim 1,
characterized in that
the controller is configured to modify a routing behavior of the communication network during the communication session using the decoupled control plane.

7. The device according to claim 1,
characterized in that
the controller is configured to modify at least one application of the communication network and/or a port mapping of the at least one application during the communication session using the decoupled control plane.

8. The device according to claim 1,
characterized in that
the controller is configured to exchange a first crypto-algorithm employed by the communication network with a second crypto-algorithm during the communication session.

9. The device according to claim 1,
characterized in that
the controller is configured to modify a data pattern of the communication network, particularly a payload data profile of at least one of the terminals.

10. The device according to claim 1,
characterized in that
the communication session includes a plurality of transactions of data, wherein the controller is configured to modify the at least one characteristic of the communication network, which is visible from the outside of the communication network, after a subset of the plurality of transactions.

11. The device according to claim 1,
characterized in that
the communication session includes a plurality of transactions of data, wherein the controller is configured to modify the at least one characteristic of the communication network, which is visible from the outside of the communication network, after each one of the plurality of transactions.

12. The device according to claim 1,
characterized in that
the controller is configured to decouple the control plane and the data plane of the data communication using software-defined-networking.

13. The device according to claim 1,
characterized by
a first protection processor for detecting, isolating, and antagonizing accesses from non-authorized entities on the communication network.

14. The device according to claim 13,
characterized by
a second protection processor for warning and alerting a determination system which is coupleable to the device.

15. The device according to claim 13,
characterized by
a third protection processor for restoring at least one critical network function.

16. The device according to claim 1,
characterized by
an analyzing processor for providing analysis data during accesses on the communication network from non-authorized entities.

17. The device according to claim 16,
characterized by
a data analyzer for determining status data using the provided analysis data, the status data being suitable particularly for specifying a security situation of the communication network.

18. The device according to claim 17,
characterized by
an interface for transmitting the status data to a determination system which is couplable to the device.

19. The device according to claim 1,
characterized in that
the communication network comprises an infrastructure of layers that are stacked on one another, wherein the controller is implemented as a virtual overlay network overlaying a layer-2 and a layer-3 of the infrastructure.

20. The device according to claim 1,
characterized in that
the device uses a combination of a security protocol and a tunneling-protocol.

21. The device according to claim 1, further configured to forward network packets between a plurality of communication networks.

22. The device according to claim 1, further configured to connect network packets with one another.

23. The device according to claim 1, further configured to protect the communication network against unwanted network accesses.

24. A communication network, comprising:
a plurality of terminals for data communication, and
a device for controlling the communication network according to claim 1, the data plane including the plurality of terminals.

25. A method for controlling a communication network having a plurality of terminals for data communication comprising the steps of:
decoupling of a data plane and a control plane of the data communication, and
pro-actively modifying at least one characteristic of the communication network which is visible from an outside of the communication network during a communication session using the decoupled control plane, wherein
pro-actively modifying at least one characteristic of the communication network includes randomly triggering a controller, via a random generator that is coupled to the controller and configured to randomly trigger the controller, for modifying the at least one characteristic, which is visible from the outside of the communication network, at least once during the communication session, and
pro-actively modifying at least one characteristic of the communication network includes modifying one or a plurality of data patterns of the communication network to simulate data traffic as a data mock-up to an attacker that is attacking the communication network from the outside of the communication network.

26. An apparatus for controlling a communication network having a plurality of terminals for data communication, the apparatus comprising:
a processor; and
a memory storing instructions that, when executed by the processor, cause the apparatus to execute the steps of:
decoupling of a data plane and a control plane of the data communication, and
pro-actively modifying at least one characteristic of the communication network which is visible from an outside of the communication network during a communication session using the decoupled control plane, wherein
pro-actively modifying at least one characteristic of the communication network includes randomly triggering a controller, via a random generator that is coupled to the controller and configured to randomly trigger the controller, for modifying the at least one characteristic, which is visible from the outside of the communication network, at least once during the communication session, and
pro-actively modifying at least one characteristic of the communication network includes modifying one or a plurality of data patterns of the communication network to simulate data traffic as a data mock-up to an attacker that is attacking the communication network from the outside of the communication network.

* * * * *